United States Patent
Lenardic et al.

(10) Patent No.: US 10,530,018 B2
(45) Date of Patent: Jan. 7, 2020

(54) PANEL, A METHOD FOR FABRICATING A PANEL AND A METHOD

(71) Applicant: Infineon Technologies AG, Neubiberg (DE)

(72) Inventors: Denis Lenardic, Jesenice (SI); Katharina Schmut, Drobollach (AT); Bernhard Goller, Villach (AT)

(73) Assignee: Infineon Technoogies AG, Neubiberg (DE)

( * ) Notice: Subject to any disclaimer, the term of this patent is extended or adjusted under 35 U.S.C. 154(b) by 228 days.

(21) Appl. No.: 14/105,681

(22) Filed: Dec. 13, 2013

(65) Prior Publication Data

US 2015/0171484 A1 Jun. 18, 2015

(51) Int. Cl.
| | | |
|---|---|---|
| *H01M 10/46* | (2006.01) | |
| *H02S 40/38* | (2014.01) | |
| *H01M 2/10* | (2006.01) | |
| *H02J 7/00* | (2006.01) | |
| *H01M 10/647* | (2014.01) | |
| *H01M 10/6551* | (2014.01) | |

(52) U.S. Cl.
CPC ....... *H01M 10/465* (2013.01); *H01M 2/1094* (2013.01); *H02J 7/0052* (2013.01); *H02S 40/38* (2014.12); *H01M 10/647* (2015.04); *H01M 10/6551* (2015.04); *Y02E 10/50* (2013.01); *Y02E 10/52* (2013.01); *Y10T 29/49108* (2015.01); *Y10T 29/49114* (2015.01)

(58) Field of Classification Search
CPC ....... H01M 10/465; H02S 40/38; H02J 3/383; H01L 31/053
See application file for complete search history.

(56) References Cited

U.S. PATENT DOCUMENTS

| | | | | |
|---|---|---|---|---|
| 5,130,892 | A * | 7/1992 | Satou | G06F 1/1616 292/175 |
| 6,229,767 | B1 * | 5/2001 | Miyazawa | G02B 27/283 368/205 |
| 6,323,416 | B1 * | 11/2001 | Komori | B32B 17/04 136/251 |
| 7,202,410 | B2 * | 4/2007 | Umemoto | H01L 31/048 136/244 |
| 8,314,323 | B2 | 11/2012 | Hishida et al. | |
| 2002/0048667 | A1 * | 4/2002 | Kauppi | B29C 45/14688 428/209 |
| 2002/0092558 | A1 * | 7/2002 | Kim | H01M 14/005 136/244 |

(Continued)

FOREIGN PATENT DOCUMENTS

| | | |
|---|---|---|
| DE | 102008027000 A1 | 12/2009 |
| EP | 1923919 A1 | 5/2008 |

OTHER PUBLICATIONS

"The Future is Light: Organic Solar Films"; Heliatek; www.heliatek.com; Dec. 12, 2013; p. 1-8.

(Continued)

*Primary Examiner* — David V Henze-Gongola
*Assistant Examiner* — Tarikh Kanem Rankine
(74) *Attorney, Agent, or Firm* — Eschweiler & Potashnik, LLC

(57) ABSTRACT

A panel according to an embodiment includes a translucent layer arrangement and a battery cell embedded at least partially into the translucent layer arrangement.

20 Claims, 10 Drawing Sheets

(56) References Cited

U.S. PATENT DOCUMENTS

| | | | | |
|---|---|---|---|---|
| 2003/0029497 A1* | 2/2003 | Tanaka | ............... | H01L 31/048<br>136/263 |
| 2003/0038610 A1* | 2/2003 | Munshi | ............... | H02J 7/35<br>320/101 |
| 2003/0062080 A1* | 4/2003 | Satoh | ............... | H01G 9/20<br>136/256 |
| 2006/0220977 A1* | 10/2006 | Ogino | ............... | H01Q 1/38<br>343/866 |
| 2007/0243459 A1* | 10/2007 | Jenson | ............... | A61N 1/3787<br>429/122 |
| 2007/0277876 A1* | 12/2007 | Huang | ............... | H01L 31/052<br>136/259 |
| 2008/0262576 A1* | 10/2008 | Creamer | ............... | A61N 5/0616<br>607/88 |
| 2010/0043319 A1* | 2/2010 | Bennett | ............... | E04D 1/30<br>52/173.3 |
| 2010/0088970 A1* | 4/2010 | Miller | ............... | E04C 2/296<br>52/1 |
| 2010/0116325 A1* | 5/2010 | Nikoonahad | ............... | H01L 27/1421<br>136/251 |
| 2011/0220182 A1* | 9/2011 | Lin | ............... | H01L 31/048<br>136/251 |
| 2011/0265840 A1* | 11/2011 | Sela | ............... | G01J 1/18<br>136/244 |
| 2012/0052363 A1* | 3/2012 | Fleischer | ............... | B82Y 30/00<br>429/149 |
| 2012/0120643 A1* | 5/2012 | Meng | ............... | B82Y 10/00<br>362/183 |
| 2013/0140965 A1* | 6/2013 | Franklin | ............... | G06F 1/1626<br>312/223.1 |
| 2013/0327375 A1 | 12/2013 | Ootsuki et al. | | |

OTHER PUBLICATIONS

"Laser Machines: c-vertica, Laser Glass Finishing Machines"; http://glassprocessing.eu/laser-glass-finishing-machines-c-vertica.htm; Dec. 12, 2013, p. 1-4.

"VSG-ISO"; Ertex Solar; ERTL Glas AG; www.ertex-solar.at; Dec. 12, 2013; p. 1-2.

* cited by examiner

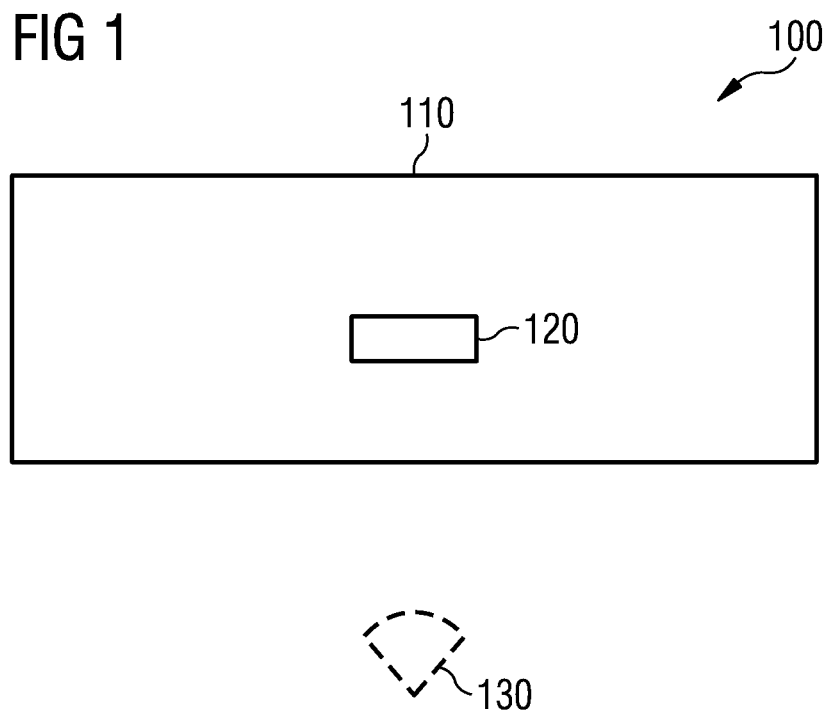

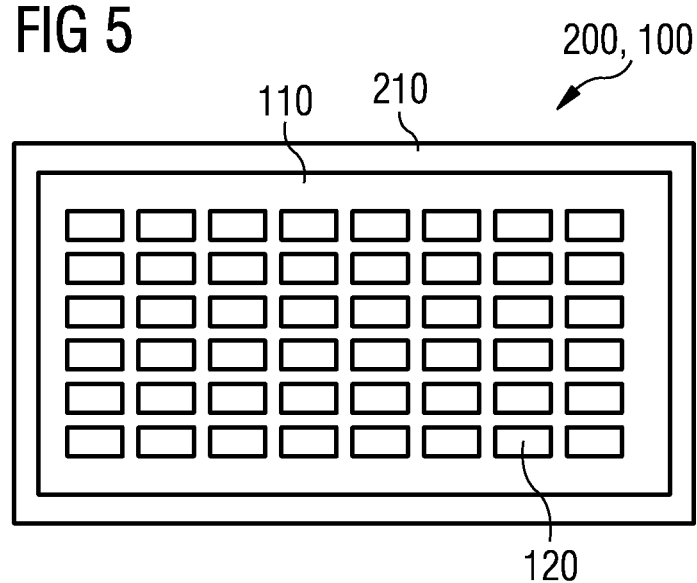
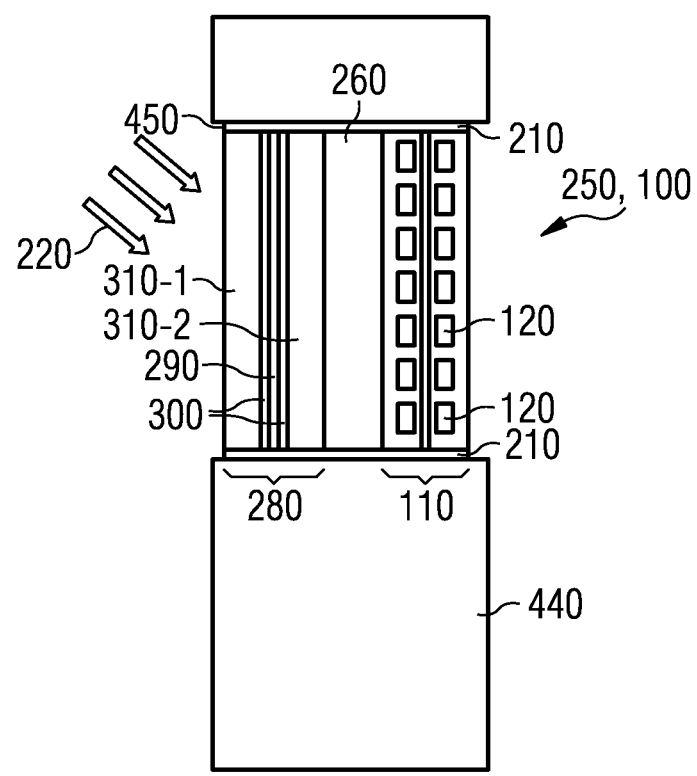

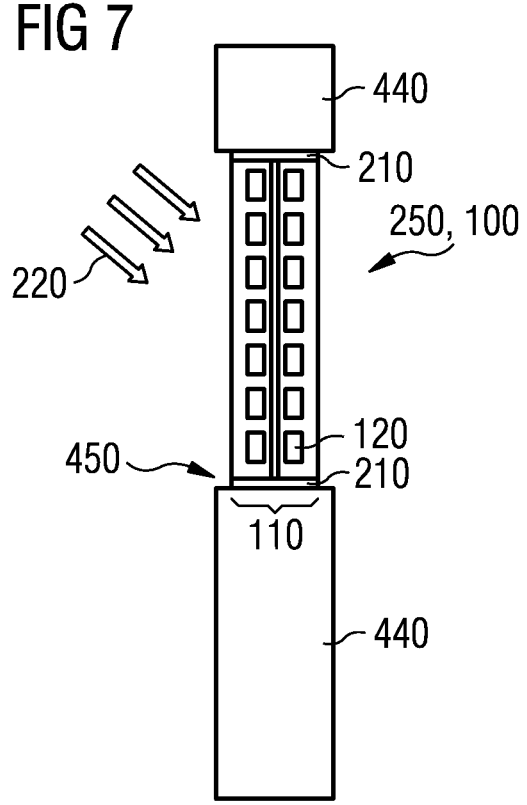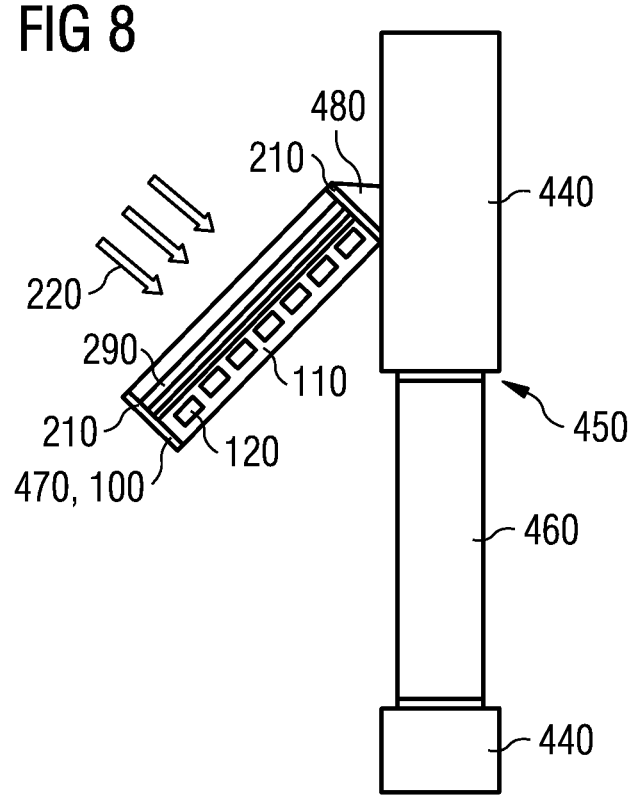

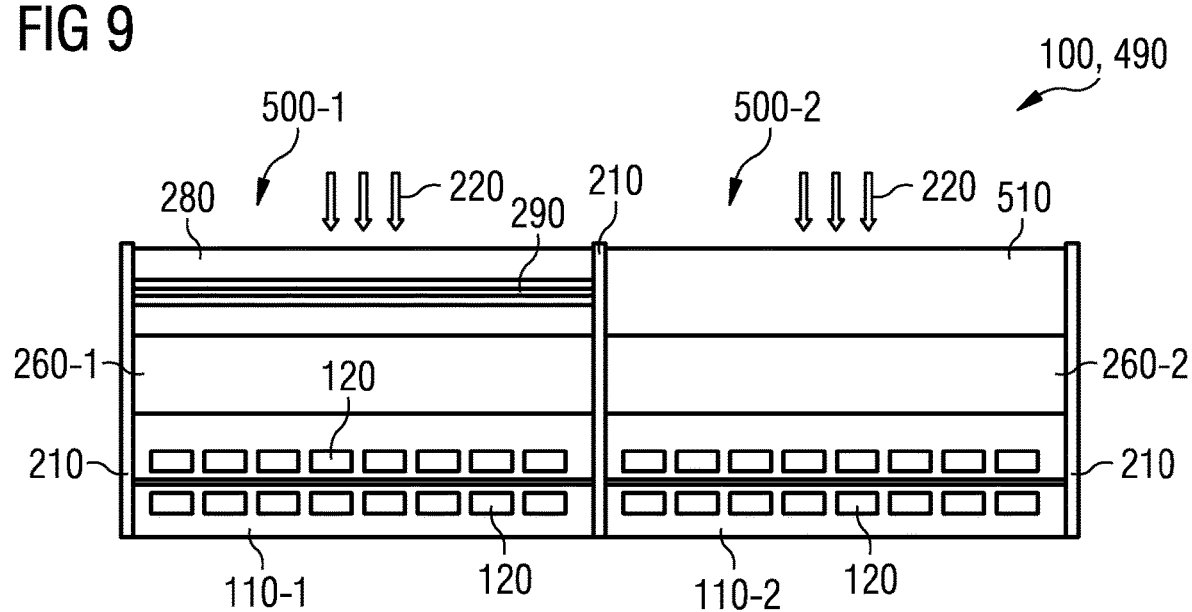
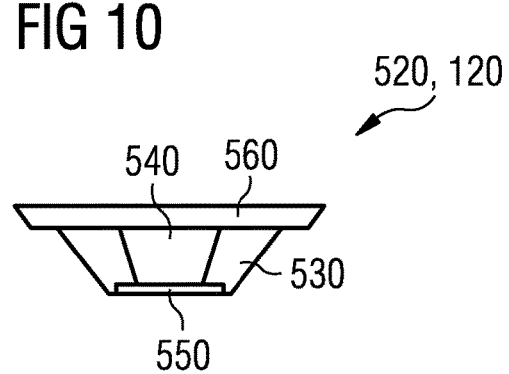

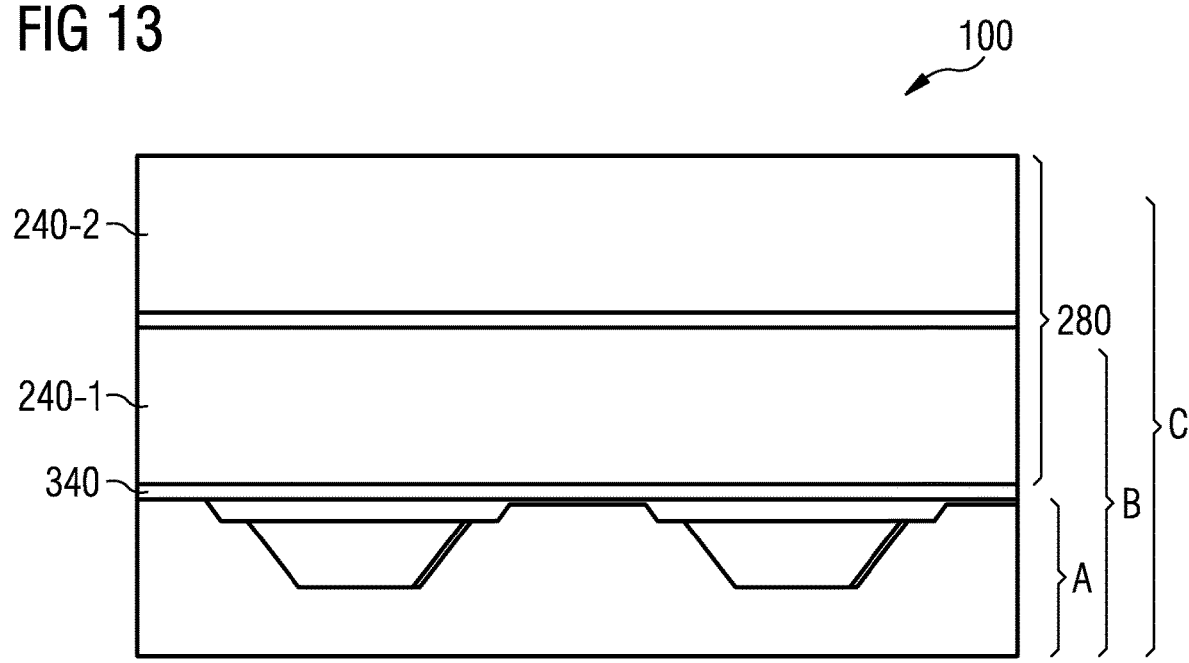
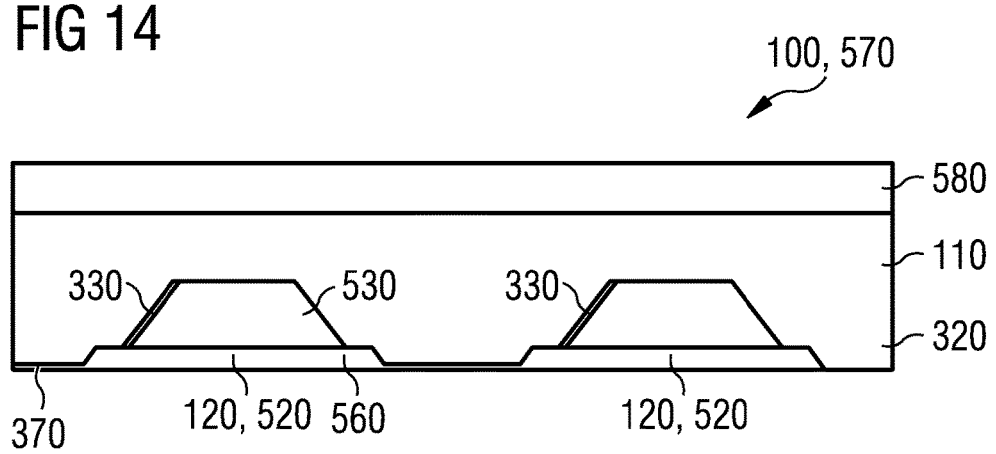

PANEL, A METHOD FOR FABRICATING A PANEL AND A METHOD

FIELD

Embodiments relate to a panel, a method for fabricating a panel and a method.

BACKGROUND

Panels are widely used in different fields of applications including, for instance, different fields of technology, such as electronics and automotive applications to name just two examples, as well as architecture. For instance, panels may be used as parts of a building façade, as part of a roof or, for instance, for interior decorations. But also in other fields of technology, panels may be used for design and/or protective reasons, as part of a glazing of a car or another vehicle as well as a part of a display. Many of these panels are at least partially translucent.

In many of these fields a need exists to provide electrical energy to devices, circuits or other components to be operated for different reasons. However, at the same time the available space as well as weight and an effort to produce and to integrate an electrical energy producing or electrical energy storing devices may represent a serious technical challenge.

SUMMARY

Therefore, a demand exists to integrate an electrical energy storing device to allow an easier implementation.

A panel according to an embodiment comprises a translucent layer arrangement and a battery cell embedded at least partially into the translucent layer arrangement.

A method according to an embodiment for fabricating a panel comprises embedding a battery cell at least partially into a translucent layer arrangement.

A method according to an embodiment comprises extracting electrically energy from a battery cell comprised in a translucent layer arrangement of a panel, wherein the battery cell is embedded at least partially into the translucent layer arrangement.

BRIEF DESCRIPTION OF THE DRAWINGS

In the following, several embodiments will be described in the enclosed Figures.

FIG. 1 shows a schematic cross-sectional view of a panel according to an embodiment;

FIG. 5 shows a schematic plan view of a vehicle sunroof as a panel according to an embodiment;

FIG. 6 shows a glass panel for a façade as a panel according to an embodiment;

FIG. 7 shows a further glass panel for a façade as a panel according to an embodiment;

FIG. 8 shows a shading system for a façade implemented as a panel according to an embodiment;

FIG. 9 shows a schematic cross-sectional view of a transparent roof glazing as a panel according to an embodiment;

FIG. 10 shows a cross-sectional view of a battery cell;

FIG. 13 shows a simplified cross-sectional view of a panel indicating different intermediate steps of fabricating the panel;

FIG. 14 shows a simplified cross-sectional view of a panel for a display according to an embodiment;

DETAILED DESCRIPTION

Figure 2A:
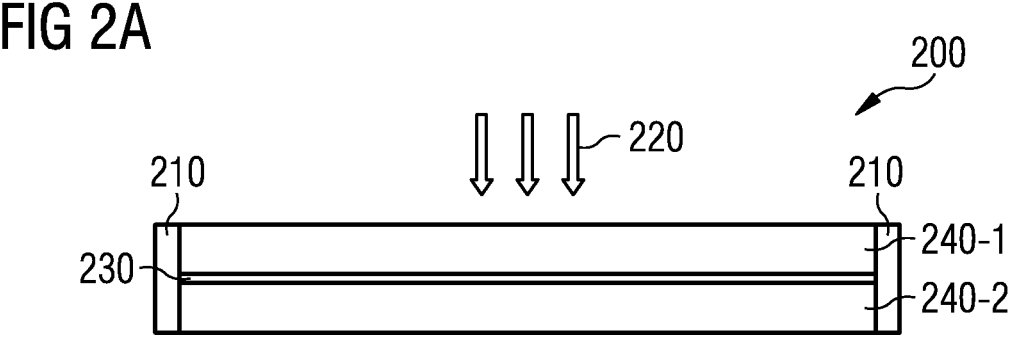
FIG. 2a shows a simplified cross-sectional view of a car glazing.

In the following, embodiments according to the present disclosure will be described in more detail. In this context, summarizing reference signs will be used to describe several objects simultaneously or to describe common features, dimensions, characteristics, or the like of these objects. The summarizing reference signs are based on their individual reference signs. Moreover, objects appearing in several embodiments or several figures, but which are identical or at least similar in terms of at least some of their functions or structural features, will be denoted with the same or similar reference signs. To avoid unnecessary repetitions, parts of the description referring to such objects also relate to the corresponding objects of the different embodiments or the different figures, unless explicitly or—taking the context of the description and the figures into account—implicitly stated otherwise. Therefore, similar or related objects may be implemented with at least some identical or similar features, dimensions, and characteristics, but may be also implemented with differing properties.

Panels may be widely used in different fields of applications comprising, for instance, both fields of technology and architecture. For instance, a panel may be used as a part of a façade or a roof of a building or a similar structure. However, also in other fields of applications and technology, panels may be used for instance, for design reasons or to protect a system, structure or object.

These panels may, for instance, be implemented to be at least partially or—in other words—partially or fully translucent. A panel may, for instance, be partially translucent in terms of a spatial distribution of its translucency, in terms of the intensity of light capable of being transmitted through the panel or parts thereof, its frequency or wavelength or any combination thereof.

In other words, a medium, such as a panel, may comprise one or more areas being translucent, while other areas of the medium are non-translucent. Additionally or alternatively, the translucent area or the translucent areas of such a medium may be translucent with respect to a single, some, a range of or several ranges of an electromagnetic spectrum comprising, for instance, the visible spectrum, the infrared spectrum and the ultraviolet spectrum to name just a few. Depending on the application in mind, the translucency of the medium with respect to the frequencies or wavelengths may be adapted accordingly, for instance, by using a coating or a respective layer being integrated into the medium.

As a consequence, not only the translucency with respect to the different wavelength or frequencies, but also with respect to an amount of spectral energy being transmitted through the medium with respect to the incident energy of the respective wavelength or frequency, the medium may be fully or only partially translucent. This may be referred to as spectral translucency.

Considering the translucency or transmittance as a function being capable of assuming values between 0 and 1 indicative of an amount of spectral energy with respect to a certain wavelength or frequency transmitted by the medium locally at a predefined position with respect to the total energy incident from the other side of the medium with respect to the same position and the same frequency or wavelength, the transmittance may assume any value in the at least partially translucent area being larger than 0 up to values including 1.

While the translucency describes the capability of a material or, for instance, the medium to allow light or other electromagnetic radiation to pass through the respective object, the property of translucency does not necessarily imply that the photons of the electromagnetic radiation in general follow Snell's Law. Snell's Law describes the refraction of light. While a transparent or at least partially transparent medium is not only capable of allowing electromagnetic radiation of one, some, one range or more ranges of the electromagnetic spectrum to pass the medium, the photons further obey Snell's Law. In other words, a transparent medium is also a translucent medium, but not necessarily the other way round.

In yet other words, a translucent medium allows the transport of light or electromagnetic radiation, while a transparent medium not only allows the transport of the light or the respective electromagnetic radiation, but also an image formation by the transported light or electromagnetic radiation through the at least partially transparent medium. The opposite property of translucency is opacity. Therefore, transparent materials may appear to be clear, optionally with an overall appearance of a color or a combination of several colors.

Similar to a medium being at least partially translucent, a medium may also be at least partially transparent with respect to at least one of a spatial distribution of areas being transparent or non-transparent, with respect to its frequency-dependency or wavelength-dependency and with respect to its transmittance.

It is to be noted that a non-transparent area or part of a medium may be translucent or non-translucent. A translucent medium or structure may be fully or partially—or in other words—at least partially translucent. In other words, any structure, medium or object being described as translucent, may be at least partially translucent. In other words, any medium, structure or object being translucent may be partially translucent, fully translucent, partially transparent or fully transparent as outlined above.

FIG. 1 shows a cross-sectional view of a panel 100 according to an embodiment. The panel comprises a translucent layer arrangement 110, into which at least partially a battery cell 120 is embedded. The translucent layer arrangement 110 may be at least partially translucent or at least partially transparent depending on the implementation. The battery cell 120 itself may also be transparent, translucent or non-translucent.

The panel 100 may optionally be at least partially spatially translucent. In this case, the battery cell may be embedded in a field of vision of the panel as illustrated by an eye 130 of an observer. For instance, the panel 100 may be a glass panel, a glass pane, a front pane, a roof pane or a similar structure which may, for instance, be used in architecture or in other fields of technology.

However, before further embodiments will be described in more detail, it might be interesting to consider some applications first. The first fields of application come from architecture and from vehicles such as motorized vehicles such as cars. Transparent or semi-transparent laminated glazings are widely used as a part of a vehicle or a building façade, roof or envelope. For instance, a glazing can be implemented in the form of a windscreen or a sunroof window in a vehicle, or common windows or larger dedicated glass parts intended for integration into transparent building facades and/or roofs to mention only a few examples. These glazings may serve different functions and purposes. For instance, they may provide an interior of a vehicle or a building with daylight and, at the same time, provide some heat protection by insulating the interior. These functions and purposes are among the most widely and, therefore, often employed functions.

The glazing itself may, for instance, include solar cells and, as a consequence fulfill an additional functionality of generating electrical energy or electricity. Similar to wafer-based solar cells, micro-batteries may be integrated into a glazing according to an embodiment. For instance, employing an embodiment according to an embodiment may allow an integration of glass, transparent or translucent materials to be used along with a battery package which exhibits a new and so far unexplored function, the function of electricity storage within a vehicle- or building-integrated glazing, where the transparent or translucent material or medium works also as a micro-battery package. As mentioned before, such a translucent or transparent material may be, for instance, a laminated glass.

As will be laid out in more detail below, a battery cell or a micro-battery or battery may be considered to be any device being capable of electrochemically storing energy. Optionally, these electrochemical energy storage devices may be rechargeable. However, this is by far a necessity. Nevertheless, a battery cell 120 may be implemented as a secondary galvanic cell or battery when, for instance, embodiments are used in the context of energy harvesting from, for instance, solar energy.

As will be laid out in more detail below, a panel 100 according to an embodiment may be used as a transparent glazing along with solar cells. Such a structure may also be referred to as a transparent solar module which may, for instance, be connected in series into one or more strings. These strings may then be connected to an inverter which may then be capable of feeding the electrical energy into a public energy grid. Naturally, as an alternative or additional implementation, micro-inverters may be used for each of the modules or each of the strings. Conventionally, the electricity generated by the solar cells is typically fed into the public grid without the possibility of energy storage. Alternatively, charge controllers and stand-alone batteries may be used to store energy.

A panel 100 according to an embodiment may be used to save and store energy produced by photovoltaic systems like solar cells in buildings when the panel is, for instance, integrated into a building glazing. In this case, the battery cell 120 or the battery cells 120 may be used to store the energy and feed the energy into the public grid to name just one example. In the case of the panel 100 being integrated into a car, for instance as a car glazing, the battery cell 120 (micro-battery) may be used to save electrical energy produced by an alternator during driving the car and support a main battery of the vehicle, for instance during the night or during parking. The energy stored in the battery cell 120 or a plurality of battery cells 120 may be used, for instance, for air conditioning support, security systems such as sensors and cameras of the parked car. However, embodiments are by far not limited to larger vehicles such as cars or trucks, but can also be implemented in smaller vehicles like city bikes and similar vehicles. For instance, in the case of a city bike, a panel 100 may be a part of a roof or a front windshield of the respective bike. In other words, one or more battery cells 120 may be integrated, for instance, into a roof, a front windshield or the like.

FIG. 2a shows a simplified cross-sectional view of a car glazing 200, such as a windscreen or a sunroof. The car glazing 200 comprises a frame 210 arranged on both lateral sides of a car glazing 200. Perpendicular to an incident direction of light 220, the car glazing 200 comprises a foil 230, which may, for instance, comprise or be a PVB foil (PVB=Polyvinyl Butyral) or a EVA foil (EVA=Ethylene-Vinyl Acetate). These two materials are used as encapsulating materials in conventional car glazing manufacturing. However, not only these materials but also other materials may be used in panels 100 according to an embodiment as will be laid out in more detail below.

On both sides of the foil 230, a layer of glass 240-1, 240-2 is laminated onto the foil 230. By laminating the layers of glass 240 onto the foil 230, a required security property of the car glazing 200 may be assured in the case of an accident and a glass break in the process. However, it is to be noted that the cross-sectional view of FIG. 2a merely represents a simplified common construction of such a vehicle glazing 200.

Figure 2B:
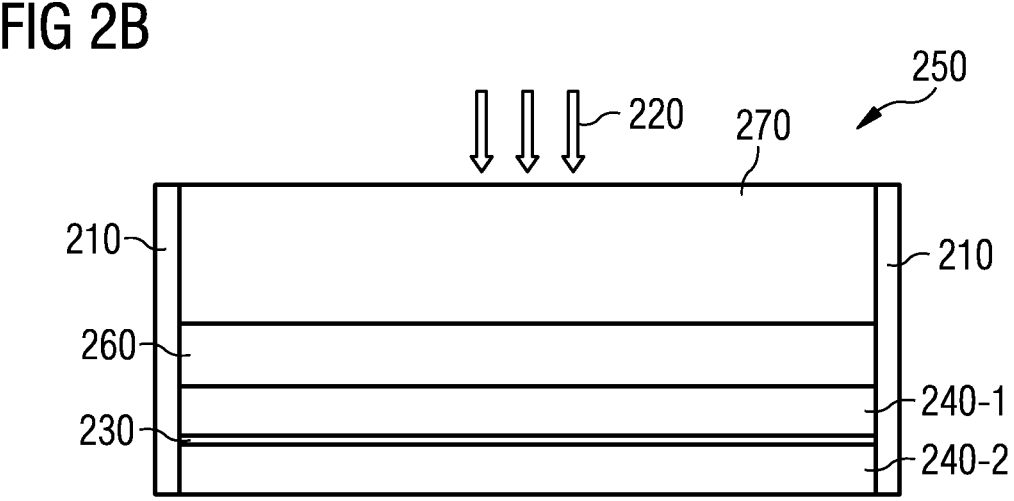
FIG. 2b shows a simplified cross-sectional view of a façade or roof glazing.

FIG. 2b shows another more conventional glazing in a simplified cross-sectional view. To be more precise, FIG. 2b shows a cross-sectional view of a common façade or roof glazing 250, which may, for instance, be used as a glass pane or window. The glazing 250 once again comprises a frame 210 arranged laterally on both sides in the cross-sectional view of FIG. 2b. The frame 210 is also referred to as a glazing frame.

The glazing 250 once again comprises a foil 230 onto which on both sides of a foil 230 layers of glass 240-1, 240-2 are laminated. Due to the laminated structure of the foil 230 and the two layers of glass 240-1, 240-2, the glazing 250 offers a safety or security property which may make the glazing, for instance, interesting for safety- or security-related applications such as a shop window or a display window.

The glazing 250, however, further comprises an encapsulated volume 260 which may, for instance, be filled with a gas to improve a thermal insulation. The volume 260 is confined by the frame 210, the encapsulant comprising the foil 230 and the two layers of glass 240 and a further layer of glass 270, which is arranged on a side opposite to the layer of glass 240-1 with respect to the volume 260. By implementing the volume 260, which may optionally be filled with a gas or comprise a vacuum, the thermal properties of the glazing 250 may also be positively influenced compared to an implementation without the volume 260. As will be laid out below, such a glazing 250 may also be used as a base for integrating one or more battery cells 120, for instance, micro-batteries to provide a panel 100 according to an embodiment.

Figure 2C:
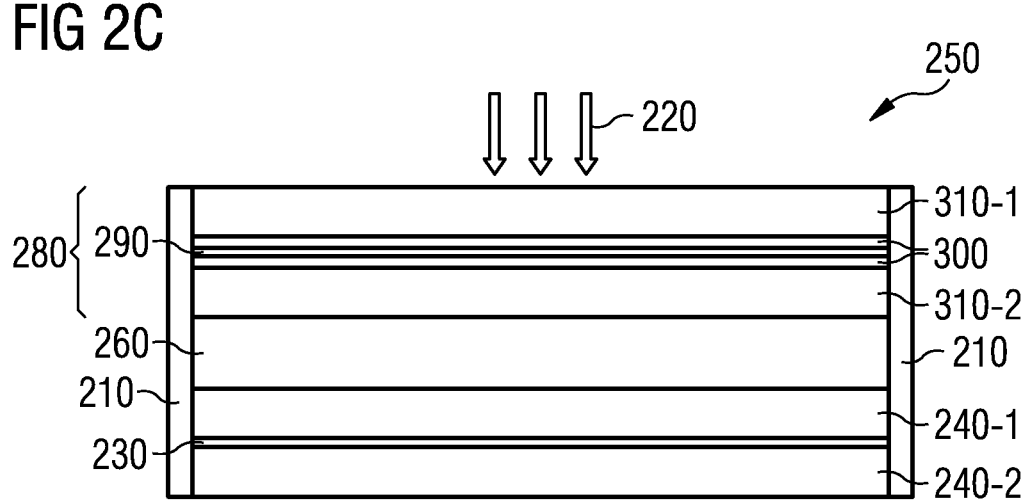
FIG. 2c shows a simplified cross-sectional view of a façade or roof glazing including solar cells.

However, before a further panel 100 according to an embodiment will be described in more detail, with respect to FIG. 2c, a further façade or roof glazing 250 will be described. FIG. 2c shows a simplified cross-sectional view of a façade or roof glazing 250, which differs from the one shown in FIG. 2b mainly with respect to the further layer of glass 270, which was replaced by an arrangement 280 comprising solar cells 290 which are embedded in an encapsulating layer 300 onto which on each side of the encapsulating layer 300 a further layer of glass 310-1, 310-2 is laminated. In other words, the façade or roof glazing 250 shown in FIG. 2c includes solar cells 290 which are laminated between a glazing formed by the further layers of glass 310 on a front side of a glazing 250 as indicated by the arrows indicating the light 220. As will be laid out below, even in such a structure battery cells 120 such as micro-batteries may be integrated to form a panel according to an embodiment. As the following description will show in more detail, micro-batteries or other battery cells 120 may be integrated into a glazing such that the resulting panel 100 according to an embodiment may be used as a glazing panel alone. However, micro-batteries or other battery cells 120 may also be part of an insulating glazing as, for instance, shown in FIG. 2b, which may include optionally solar cells 290 to form a transparent solar module. The micro-batteries or battery cells 120 may be connected to a micro-inverter to feed energy into a public grid, when, for instance, used in a building integrated glazing or which can be used as an additional power source, for instance, in a standby mode.

However, it is to be noted that the proposed solution is by far not limited to vehicle and building glazings, but can also be used in numerous other small-scale or large-scale applications, like package-less integration of micro-batteries into glass substrates for displays such as LC displays (LC=Liquid Crystal) or similar applications. Micro-batteries or other battery cells 120 can be integrated not only into common glass but also into translucent or transparent plastic glazings like polycarbonate or similar materials.

As will be laid out in more detail below, an integration of a battery cell 120 into a glazing or a translucent layer arrangement 110 may be achieved, for instance, by a lamination process of two glazings with the battery cells 120 placed between. Additionally or alternatively, profiled or pre-patterned glass may be used as a substrate for the micro-batteries or other battery cells 120 and an additional lamination process may be used to encapsulate the battery cells 120.

Figure 3:
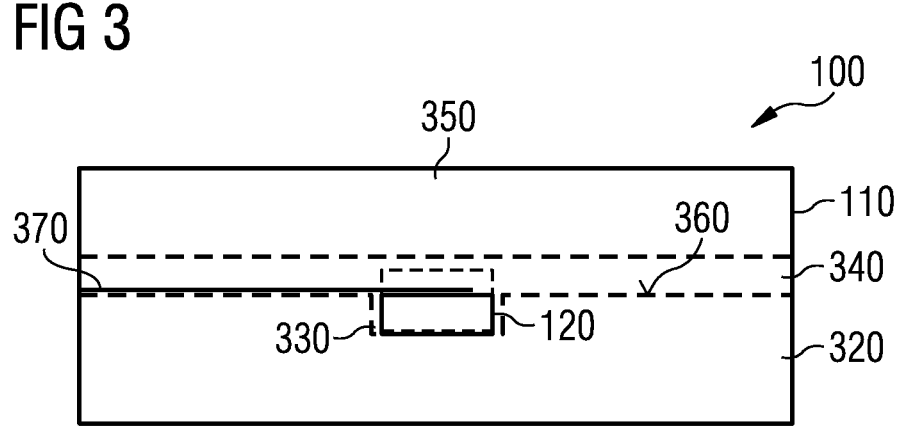
FIG. 3 shows a simplified cross-sectional view of a panel according to an embodiment.

FIG. 3 shows a simplified cross-sectional view of a panel 100 according to an embodiment. Once again, the panel 100 comprises a translucent layer arrangement 110 into which a battery cell 120 is at least partially embedded. In the embodiment shown in FIG. 3, the battery cell 120 is—to be more precise—fully embedded into the translucent layer arrangement 110. The translucent layer arrangement 110 shown in FIG. 3 comprises a pre-patterned translucent layer 320, which comprises a recess 330, which is adapted to accommodate the battery cell 120 fully or at least partially. FIG. 3 shows as a solid line the battery cell 120 being fully accommodated by the recess 330 of the pre-patterned translucent layer 320. However, when, for instance, the battery cell 120 is implemented as shown by the dotted line in FIG. 3, the recess 330 may only be able to accommodate the battery cell 120 partially.

The pre-patterned translucent layer 320 may be formed by a glass material. The glass material may be, for instance, any amorphous or non-crystalline solid material only comprising a short range order. For instance, the glass material may be silica-based ($SiO_2$) which may represent a major constituent of the glass material. However, the glass material may also comprise synthetic or organic solids, for instance, PMMA (PMMA=Poly(methylmethacrylate)) or similar materials.

The panel 100 may further comprise an encapsulating layer 340 which may be deposited in such a way that it covers the recess 330 and the battery cell 120. The encapsulating layer 340 may also comprise EVA (Ethylene-Vinyl Acetate) and/or PVB (Polyvinyl Butyral). Moreover, silicones and some plastic silicone-based materials may equally well be used. Transparent polyurethane, ionomers, UV-curable resins (UV=Ultra Violet Light) and other new polymer materials may also be comprised in or be used as a material for the encapsulating layer 340. Compared to the more commonly used EVA and PVB, newer encapsulating materials and procedures may eventually be used at lower laminating process temperature, which may shorten the process time, offer the possibility of a smaller effort concerning fabrication and, therefore, costs, and may be more compatible with temperature requirements set forth by other structures and processes. By using any of these encapsulating materials between two layers comprising a glass material, one may improve mechanical properties of a resulting laminate, for instance, in view of glass breaking or the like.

Optionally, on top of the encapsulating layer 340 on a side opposite to that of the pre-patterned translucent layer 320, the translucent layer arrangement 110 may further comprise a further translucent layer 350. In other words, the further translucent layer 350 may be implemented essentially recess free. Naturally, to mount the panel 100, some recesses may be implemented such as holes or the like. However, in the area of the battery cells 120, the further translucent layer 350 may be recess free. Naturally, instead of a further translucent layer 350 also a non-translucent layer may be used.

Although the further translucent layer 350 is shown in FIG. 3 as a non-patterned layer, the further translucent layer 350 may equally well be implemented as a pre-patterned translucent layer similar to the pre-patterned translucent layer 320, for instance, when the battery cell 120 is only partially accommodated by the recess 330 of the pre-patterned translucent layer 320.

In the case that the panel 100 is at least partially spatially translucent, the encapsulating layer 340 may cover a surface 360 of a pre-patterned translucent layer 320 in a field of a vision of the panel 100 essentially completely. In this case, the encapsulating layer 340 may, for instance, comprise a translucent or transparent material itself. For instance, the encapsulating layer 340 may comprise a resin or silicone.

As will be laid out in more detail below, pre-assembled profiled glass or pre-patterned translucent layers 320 may be produced by different production procedures comprising, for instance, glass rolling or etching to name just two examples.

The translucent layer arrangement 110 as shown in FIG. 3 further comprises an electrical contact structure 370 to electrically couple the battery cell 120 to extract electrical energy from the battery cell 120 and/or to charge the battery cell in case the battery cell 120 is a secondary battery cell. The electrical contact structure 370 may, for instance, be deposited onto the surface 360, for instance, by printing, depositing the electrical contact structure 370 patterned or by depositing a layer comprising the material of the electrical contact structure 370 and subsequently patterning the layer to obtain the electrical contact structure 370.

Depending on the application, it may be favorable to implement the electrical contact structure 370 to be translucent. This may, for instance, be achieved by using an electrically-conducting translucent material for the electrically-conducting structure. Such a translucent material may, for instance, be a translucent conductive oxide (TCO) or another transparent or translucent conducting film material, capable of being deposited as a thin layer. Examples for transparent conducting polymers which may be used as transparent conducting film materials, are, for instance, Poly(3,4-ethylenedioxythiophene) (PEDOT), Poly(3,4-ethylenedioxythiophene) PEDOT, poly(styrene sulfonate) (PSS) and Poly(4,4-dioctylcyclopentadithiophene).

However, the electrically-conducting structure may also be fabricated in such a way that in principle a non-translucent material such as gold (Au), copper (Cu), Aluminum (Al) or any other conducting material may be used with a thickness such that a transmittance of the electrical contact structure is still high enough for the translucent layer arrangement 110 to be at least partially translucent. For instance, depending on the materials used, a thickness of a few nanometers of a material may still render the electrical contact structure 370 translucent.

Figure 4:
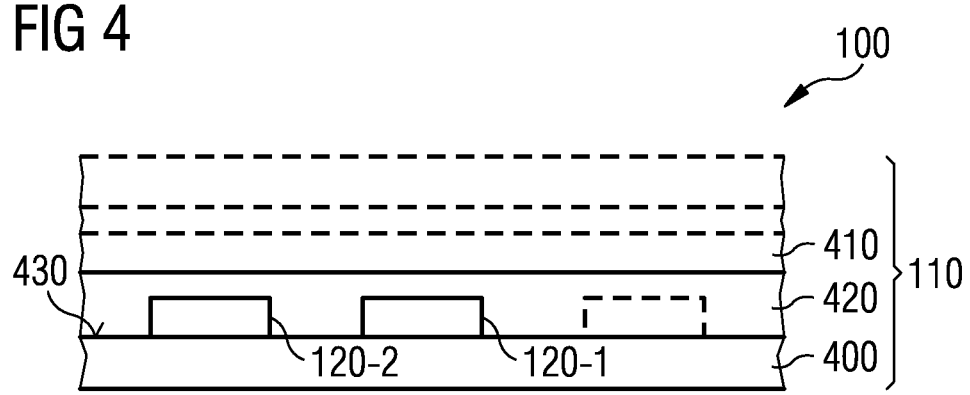
FIG. 4 shows a simplified cross-sectional view of a panel according to another embodiment.

FIG. 4 shows a further simplified cross-sectional view of a panel 100 according to an embodiment. Once again, the panel 100 comprises a translucent layer arrangement 110 comprising at least one battery cell 120 embedded at least partially into the translucent layer arrangement 110. To be more precise, the panel 100 as shown in FIG. 4 comprises a plurality of battery cells 120 or, in other words, two or more battery cells 120-1, 120-2. Naturally, instead of implementing a plurality of battery cells 120 in the panel 100 of FIG. 4, only a single battery cell 120 may be implemented. Accordingly, in the previously-described panels 100, where the corresponding Figures only showed a single battery cell 120, also a plurality of battery cells 120 may equally well be implemented.

In case of a plurality of battery cells 120 being implemented, the battery cells may be used and coupled to provide a higher voltage compared to a single battery cell and/or to provide a higher current than a single battery cell 120. By coupling more than one battery cell 120 into a series connection, the corresponding output voltage of the battery cells is increased, while in a parallel connection the currents provided by the battery cells add up. As a consequence, for instance by coupling battery cells into series connections and by coupling a plurality of series connections into a parallel connection or vice-versa, an increase of both the voltage and the current may be achievable.

The translucent layer arrangement 110 as shown in FIG. 4 comprises a translucent first layer 400 and a second layer 410 as well as an adhesive layer 420 which is capable of bonding the first layer 400 and the second layer 410. The single battery cell 120 or the plurality of battery cells 120 are in this case arranged between the first layer 400 and the second layer 410 in such a way that the adhesive layer 420 surrounds the battery cell 120 or the battery cells 120 at least laterally. In the example shown in FIG. 4, the adhesive layer 420 also covers the battery cells 120.

Independent of one another, both the second layer 410 and the adhesive layer 410 may be translucent. For instance, the adhesive layer 420 may comprise at least one of a silicone and a resin.

In contrast to the example shown in FIG. 3, the battery cells 120 as shown in FIG. 4 are mounted on an at least locally smooth surface 430 of the first layer 400. However, in other embodiments, the battery cells 120 may also be mounted on an at least locally smooth surface of the second layer 410. In other words, a vicinity exists around each of the respective battery cells 120 being mounted on a locally smooth surface, in which the surface 430 may be described by a single vector being perpendicular to the surface 430 throughout the vicinity. For instance, the vicinity may comprise an area being at least 1.1-times the size of the battery cell 120 on the surface 430. In other examples, the vicinity may even be larger, for instance, comprise at least 1.2-times, 1.3-times or even 1.5-times the size of the battery cell 120 on the surface 430 of the first layer 400. Depending on the geometry, the battery cells 120 are not mounted in a recess as described in the context of FIG. 1. In other words, the respective battery cells 120 being mounted on the at least locally smooth surface 430 are mounted in an area of the first layer 400, which is recess free.

Naturally, the same may also apply to the second layer 410. Naturally, also a combination of the embodiments shown in FIGS. 3 and 4 may be implemented. For instance, to name just one example, the further translucent layer 350 of FIG. 3 may be implemented as the first or second layer 400, 410 of the panel 100 shown in FIG. 4.

As will be laid out in more detail below, the car glazing 200 as well as the glazings 250 shown in FIGS. 2a, 2b and 2c, respectively, may be used as a base for integrating battery cells 120 to implement panels 100 according to an embodiment. However, although in the following some possible applications for vehicle glazings and building glazings with integrated battery cells 120 will be presented, embodiments are not limited to these fields of applications.

FIG. 5 shows a plan view of a car glazing 200 in the form of a vehicle sunroof. Once again, the car glazing 200 comprises a frame 210 and a translucent layer arrangement 110 with a plurality of battery cells 120 being integrated or embedded into the translucent layer arrangement 110. Hence, the car glazing 200 of FIG. 5 may be a panel 100 according to an embodiment. A similar approach may also be used for roofs and other parts of other vehicles like leisure vehicles.

FIG. 6 shows a further application of a glazing 250 comprising integrated micro-batteries or other battery cells 120, which may be mounted into or onto a façade 440 of a building. The glazing 250 once again comprises a frame 210, which is mounted into an opening 450 of the façade 440. Similar to the implementation of FIG. 2c, the glazing 250 comprises an arrangement 280, which may form a transparent solar module, comprising two further layers of glass 310-1, 310-2 which are laminated onto an encapsulating layer 300 comprising solar cells 290. The glazing 250 accordingly forms a transparent solar module.

The glazing 250 further comprises a translucent layer arrangement 110 arranged to form a volume 260 in between the frame 210, the arrangement 280 and the translucent arrangement 110. Once again, the volume 260 may, for instance, comprise a gas or a vacuum to provide thermal insulation.

The translucent layer arrangement 110 comprises a plurality of battery cells 120 embedded into the translucent layer arrangement 110. For instance, the translucent layer arrangement 110 may comprise laminated layers of glass laminated onto a foil to form a laminated glazing with integrated batteries or battery cells 120. In this case, the translucent layer arrangement 110 may, for instance, comprise a translucent first layer in the form of a glass pane, an adhesive layer and a translucent second layer formed, for instance, by a translucent or transparent foil. As outlined in FIG. 6, the foil may then form a basis for a similar arrangement of a further translucent first layer and a corresponding further adhesive layer forming an opposite side to be laminated onto the foil or the previously-mentioned second layer as shown in FIG. 6. The glazing 250, therefore, represents a panel 100 according to an embodiment.

The panel 100 or glazing 250 as shown in FIG. 6 is a transparent solar module which may be used as a window pane. The solar cells 290 may be used to generate electrical energy which may then be stored in the battery cells 120. To allow the solar cells 290 to convert the light 220 most efficiently, it may be advisable to use the glazing 250 in such a way that the solar cells 290 face the light 220. Due to the volume 260, which may be optionally filled with a gas or a vacuum, the transparent solar module with integrated battery cells 120 may be implemented as a thermally-insulating solar module or window pane. Naturally, the battery cells 120 may be implemented as micro-batteries as will be laid out in more detail below.

FIG. 7 shows a cross-sectional view of a further glazing 250 which may once again be used as a window pane or a similar structure in an opening 450 of a façade 440. However, in contrast to the glazing 250 as shown in FIG. 6, the glazing 250 of FIG. 7 only comprises the translucent layer arrangement 110 as outlined before. In other words, the glazing 250 is—compared to the glazing 250 of FIG. 6—a more simple laminated glazing 250 with battery cells 120, for instance micro-batteries, integrated into a translucent layer arrangement 110.

FIG. 8 shows a cross-sectional view of a façade 440 which comprises an opening 450. However, in contrast to the previously-described glazings 250 into the opening 450 a window pane 460 is mounted.

On an outside of a façade 440, from where the light 220 falls onto the window pane 460, a shadow-voltaic panel 470 is mounted to the façade 440 via an angle piece 480. The angle piece 480 may be adapted such that the shadow-voltaic panel 470 is approximately oriented perpendicular to the incident light 220. However, implementing an angle piece 480 with a fixed angle is by far not necessary. To be more precise, it may be possible to adjust the angle or not to install an angle piece 480 at all.

The shadow-voltaic panel 470 comprises a frame 210 which is mounted to the angle piece 480 and surrounds at least partially a translucent layer arrangement 110 comprising, for instance, a foil 230 as outlined before in context with FIGS. 6 and 7. Into the translucent layer arrangement 110 a plurality of battery cells 120 is integrated or embedded. The battery cells 120 may, once again, be integrated, for instance as micro-batteries.

The translucent layer arrangement 110 further comprises solar cells 290 which may be arranged to face the incident light 220. The battery cells 120 may be arranged on an opposite side of the translucent layer arrangement 110. To put it in more general terms, it may be advisable to implement the battery cells 120 further away from the incident light 220 than the solar cells 290 to allow the solar cells 290 to collect the light 220 as undisturbed as possible. In other words, FIG. 8 illustrates batteries or other battery cells 120 being integrated into a shading system along with solar cells.

Therefore, the shadow-providing voltaic panel 470 also represents a panel 100 according to an embodiment.

FIG. 9 shows in a schematic cross-sectional view a transparent roof glazing 490 with integrated batteries or battery cells 120. To be more precise, the transparent roof glazing 490 as depicted in FIG. 9 comprises a first section 500-1 and a second section 500-2, which are both mounted in a frame 210 for easier mounting into a corresponding opening of a roof or a similar structure. However, using a frame 210 as depicted, for instance in FIG. 9, is by far not necessary. Instead of a frame 210 also other mounting techniques may be used.

Both the first and second sections 500-1, 500-2 comprise a translucent layer arrangement 110-1, 110-2, respectively, which comprise each a plurality of battery cells 120 embedded into the translucent layer arrangements 110-1, 110-2. As described above, the battery cells 120 may, for instance, be embedded into their respective translucent layer arrangements 110 by using a foil or a similar technique. The translucent layer arrangements 110 are mounted to the frame 210.

Each of the sections 500-1, 500-2 comprises a volume 260-1, 260-2, respectively, which may once again be filled with a gas or a vacuum to provide thermal insulation. The volumes 260-1, 260-2 are confined by the frame 210 and the translucent layer arrangement 110 as well as a further arrangement 280 and a glass pane 510, respectively. In other words, the second section 500-2 comprises the glass pane 510 to confine its volume 260-2. Through the glass pane 510 light 220 may fall onto the translucent layer arrangement 110.

In contrast, the first section 500-1 comprises the previously-mentioned arrangement 280, which in turn comprises solar cells 290 as described before. Once again, it may be favorable to arrange the arrangement 280 along with its solar cells 290 so that the incident light 220 falls onto the solar cells 290 first.

The battery cells 120 may, for instance, be used to store the energy generated by the solar cells 290.

The transparent roof glazing 490 may be mounted as a panel 100 according to an embodiment into a roof to provide electrical energy, provide thermal insulation and, optionally, shadow. In other words, the transparent roof glazing 490 as shown in FIG. 9 shows a possible application of glazing integrated micro-batteries including the translucent layer arrangement 110 with, for instance, micro-batteries being integrated as a part of a solar module or transparent glazing with or without the solar cells 290.

The previous discussion has shown, some possible applications, where glass or glazing with integrated micro-batteries or battery cells 120 have been used. Examples may, for instance, comprise vehicle-related applications such as a roof window for a vehicle as shown, for instance, in FIG. 5, an integration into an upper part of a windscreen, a transparent roof for small city bikes, a transparent roof or glazing for electric leisure vehicles like golf vehicles or similar vehicles and vehicle rear mirrors comprising, for instance, a stack of glass with integrated batteries or microcells and a common mirror. In terms of building-related applications, a panel 100 according to an embodiment may, for instance, be used as a transparent window, roof with or without heat insulating properties and optional solar cells as, for instance, shown in FIGS. 6, 7 and 8. Further building-related applications may, for instance, comprise integrating a panel 100 according to an embodiment as a carport roof, bus shelters or similar small roofs, and emergency phone or tourist information site roofs.

Other small-scale applications of a panel 100 according to an embodiment may comprise batteries or battery cells being integrated into glass or plastic substrates. For instance, batteries or battery cells may be integrated into a glass substrate of small displays, such as LC displays (LC=Liquid Crystal), or solar cells as will be outlined in more detail with respect to FIG. 14. Panels 100 may furthermore be used as backside or substrates for LED safety flashing lights for cyclists, passengers and other similar applications (LED=Light Emitting Diode). Furthermore, batteries may be integrated into an upper part of a helmet's visor, for instance to provide power for communication equipment and the like.

Such glazings as the ones described above may, for instance, be a part of an e-mobility filling station. For instance, the battery cells 120 embedded in a translucent layer arrangement 110 of a panel 100 may be used as a partial source of energy for electro-vehicles, for instance, when being integrated as a transparent carport roof. With energy storage in micro-batteries or other battery cells 120 it may be possible to implement a better energy management though it may lead to an improved grid stability, a better grid management and/or lower losses of energy since energy may only be fed into the grid when it is really needed.

Before further examples of integration of package-less micro-batteries and other battery cells 120 to be used as glazings with a battery package for energy storage will be described in more detail, a possible implementation of a battery cell 120 in the form of a micro-battery to be integrated into a laminated glazing or another translucent layer arrangement 110 will be described. It is to be noted that different kinds of battery cells 120 and micro-batteries may be integrated or embedded in translucent layer arrangements.

Before different technologies for batteries and battery cells will be described, it is worth noting that a battery may comprise one or more battery cells 120. In case a battery comprises only a single battery cell 120, the terms battery cell and battery may be used synonymously. However, a battery may also comprise a plurality of battery cells 120, which may, for instance, be coupled in series to increase an available voltage, in parallel to increase an available current and to reduce an internal resistance or any combination thereof.

Battery cells 120 may be implemented as primary battery cells or secondary battery cells. Primary battery cells typically transform chemical energy irreversibly into electrical energy. When a supply of reactants is exhausted, energy cannot be readily restored to the battery.

In contrast, secondary battery cells may be recharged. In other words, their chemical reactions providing electrical energy may be reversed by supplying electrical energy to the battery cell, which may lead to an approximately restoring of their original composition. However, due to practical considerations, even secondary battery cells are typically not indefinitely rechargeable due to dissipation of the active materials, loss of electrolytes, internal corrosion and other parasitic effects.

Primary battery cells may in principle provide a current or a voltage immediately on assembly. Due to their nature, they are primarily used as disposable energy providing devices, since their chemical reactions are typically not easily reversible. However, primary battery cells may provide higher energy densities compared to secondary battery cells, depending on the types used.

Secondary battery cells, which are also referred to as rechargeable batteries or rechargeable battery cells typically have to be charged before their first use. However, they may also be assembled in a pre-charged or fully-charged state. Rechargeable or secondary battery cells may be charged or re-charged by applying an electric current to their electrodes, which may reverse the chemical reactions that occur during discharge or use. Secondary battery cells may, for instance, be implemented as sealed dry cell types which may be useful in mobile applications. Cells of this type may be, for instance, based on nickel-cadmium technology (NiCd), nickel-zinc technology (NiZn), nickel metal hydrate technology (NiMH), and lithium-ion technology (Li-ion). Lithium-ion cells may, for instance, be implemented using lithium cobalt oxide ($LiCoO_2$), lithium manganese oxide ($LiMn_2O_4$), lithium iron phosphate (LiFePO4), lithium nickel manganese cobalt oxide ($LiNiMnCoO_2$), lithium nickel cobalt aluminum oxide ($LiNiCoAlO_2$) or lithium titanate ($Li_4Ti_5O_{12}$) to name just a few examples.

Battery cells 120 may be implemented as wet cells comprising a liquid electrolyte. The liquid electrolyte may cover all or at least some internal parts of the battery cell. They may also be implemented as dry cells which may, for instance, use a paste electrolyte, which may only comprise enough moisture to allow a current to flow. Moreover, battery cells may also be implemented based on molten salt, both as primary and secondary battery cells.

In the following three different battery cells which may be implemented as micro-batteries will be described in more detail. In the case of a process for fabricating a panel 100 with a commonly-used EVA (Ethylene-Vinyl Acetate) or PVB (Polyvinyl-Butyral) foils may comprise a vacuum lamination procedure under comparably high temperatures in the range of 120° C. to 150° C. Depending on the process flow, it may be advisable, under some circumstances even necessary, to employ a battery cell technology, which allows these high temperatures to be used during a high temperature lamination process. Examples may, for instance, be solid-state batteries or battery cells, which may also have adequate mechanical properties in terms of stress resistance to sustain the lamination process. A solid-state battery cell may be a battery cell which exhibits both solid state electrodes and a solid electrolyte.

In a case of a lamination process, during which the micro-batteries or battery cells 120 are laminated using TPSE (Thermoplastic Silicone-Based Encapsulant), the silicone-based encapsulant, a similar thermoplastic encapsulant or another encapsulant with similar features and properties and a low curing temperature may be used. Materials like these may allow to lower a curing temperature of the encapsulant compared to other processes such as the above-referenced high temperature lamination process. In these cases, the encapsulant may comprise silicone and/or TPSE. Moreover, depending on the actual flow of the process, a mechanical stress exerted onto the battery cells 120 during the fabrication may be lower. As a consequence, a lifetime of a panel 100 being fabricated using such a lamination procedure may be longer.

However, other possible encapsulant materials including, for instance, ionomers, UV-curing resins and other materials may also be used. In this integration concept, it may be possible to implement micro-batteries and battery cells with liquid electrolyte, such as lithium-ion battery cells. These cell systems may, however, be more sensitive in connection with assembly temperatures but may also, in return, possess a much better energy density, compared for instance to other solid-state battery technologies. As will be outlined below, lithium-ion-based battery cells may, for instance, be implemented based on a silicon (Si) anode.

However, it may also be possible to directly integrate the micro-batteries or battery cells 120 into a pre-structured or pre-patterned glass, for instance, by gluing without additional encapsulant materials, but using the glass itself as an encapsulant. To implement an electrical contact, a transparent conducting oxide (TCO) or other transparent conducting polymers and materials or films (TCF; Transparent Conducting Film) may be used as outlined above.

A panel 100 may, for instance, use package-less micro-batteries comprising one or more battery cells. Additionally, or alternatively, micro-batteries or battery cells integrated into glass may also be laminated as outlined below leading to laminated glazing by using, for instance, a suitable encapsulation material such as silicone, PVB foil or the like. Additional glazing layers may be used.

In the following, examples will be outlined and described in more detail based on micro-batteries with a single battery cell 120 which are integrated or embedded in a translucent layer arrangement 110 using a silicone-based or similar encapsulant material with a low curing temperature of, for instance, less than 100° C. The encapsulation may, for instance, be done by common encapsulating equipment, which may be used in the industry for solar module lamination or with dedicated equipment used only for lamination of glazing with micro-batteries or similar battery cells.

However, before these examples are described in more detail, a micro-battery 520 comprising a single battery cell 120 will be described first. FIG. 10 shows a schematic cross-sectional view of a micro-battery 520 comprising a single battery cell 120. As a consequence, the micro-battery 520 is implemented as a single battery cell 120. The battery cell 120 comprises a substrate 530, which may, for instance, be a doped silicon (Si) substrate. The substrate 530 comprises a cavity 540, which is in contact with a first electrode material 550 and a second electrode material 560. The cavity 540 is arranged along a straight line between the first and second electrode materials 550, 560.

The first electrode material 550 may, for instance be a doped region of the substrate 530. In contrast, the second electrode material 560 may, for instance, comprise lithium nickel cobalt aluminum oxide ($LiNiCoAlO_2$), which is also referred to as NCA, as a cathode material. In other words, the doped silicon (Si) region forming the first electrode material 550 may be the anode material.

The cavity 540 may, for instance, comprise the electrolyte, which may also act as a source for the lithium ions. The electrolyte and the lithium ion source may, for instance, be implemented as a porous slurry. The electrolyte may be, for instance, a liquid or solid electrolyte. Optionally, the cavity 540 may further comprise a separator to separate the cavity 540 in a first portion and a second portion, which are in contact with a first electrode material and a second electrode material 550, 560, respectively.

The first electrode material 550 acting, for instance, as the anode of the battery cell 120, may be electrically coupled to an outside structure using the substrate 530 as an electrical conductor. Therefore, the doping concentration of the substrate 530 may eventually be chosen high enough to ensure the sufficiently low Ohmic contact of the first electrode material 550. The substrate 530 may act, therefore, not only as a battery case but also as an electrical conductor to electrically contact the first electrode material 550 on a side opposite to that of a first electrode material 550.

The battery cell 120 as shown in FIG. 1 may, for instance, comprise a thickness of several ten to several hundred micrometers and a typical diameter of 100 μm to several millimeters. Naturally, the battery cell 120 may comprise further structures such as an edge termination.

Figure 11:
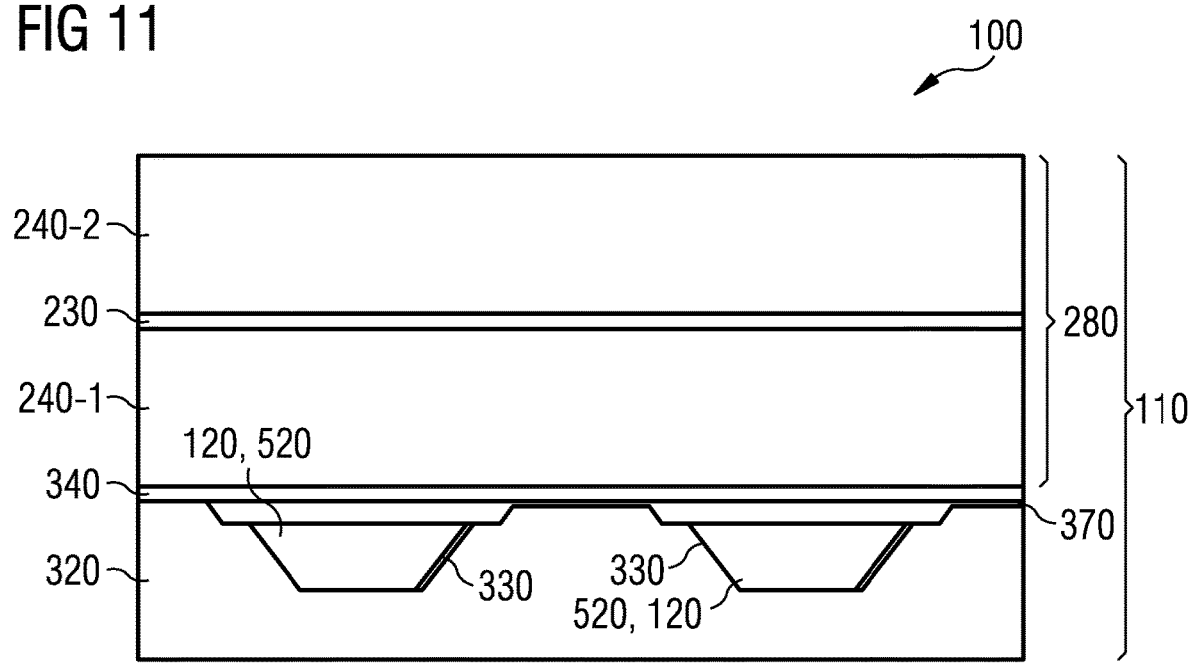
FIG. 11 shows a simplified cross-sectional view of a panel according to an embodiment in the form of a glass panel.

FIG. 11 shows a schematic cross-sectional view of a panel 100 comprising a more complex layout of the translucent layer arrangement 110. The translucent layer arrangement 110 comprises a pre-patterned layer 320, for instance, a structured glass, comprising as in FIG. 11 a plurality of recesses 330 into which micro-batteries 520 as battery cells 120 and as described before, are arranged. To electrically contact the micro-batteries 520, on top of the pre-patterned translucent layer 320, an electric contact structure 370, for instance in the form of a TCO contact layer is deposited to electrically contact both the anodes and the cathodes of the micro-batteries 520.

On top of the electrical contact structure 370 an encapsulant or encapsulating layer 340 is deposited, for instance, TPSE or any other suitable material. On top of the encapsulating layer 340 an arrangement 280 comprising two layers of glass 240-1 and 240-2 along with an encapsulant, for instance a PVB foil 230 is laminated. As will be laid out in context with FIGS. 12 and 13, depending on the application in mind, the detailed structure of the glazing with the integrated micro-batteries 520 may be adapted to fulfill different requirements.

Figure 12:
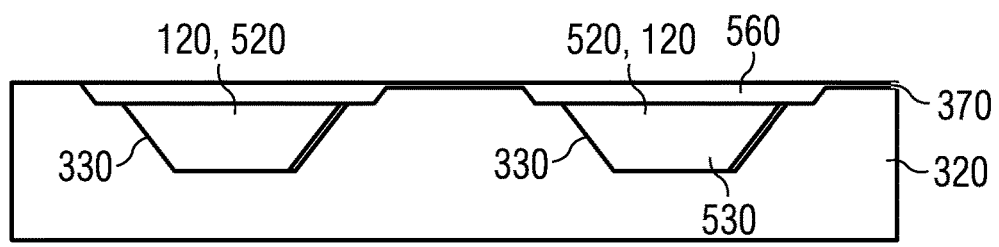
FIG. 12 shows a simplified cross-sectional view of an intermediate step of a panel according to an embodiment during fabrication.

As illustrated in the schematic cross-sectional view of FIG. 12, in a pre-patterned translucent layer 320 the micro-batteries 520 (battery cells 120) may be arranged in their respective recesses 330 to integrate the micro-batteries 320 into the structured glass. To provide the electrical contact, in a following process, the electrical contact structure 370 comprising, for instance, a contact layer of TCO, may be deposited to electrically contact both the first electrode material 550 (not shown in FIG. 12) via the substrate 530 acting as the anode of the micro-battery 520 and the second electrode material 560 acting as the cathode of the micro-battery 520.

Depending on the application in mind, the structure shown in FIG. 12 can be extended according to the requirements of the specific application. For instance, as shown in FIG. 13, by the letter A the structure of FIG. 12 may be covered by an encapsulating layer 340 as described before. In other words, the structure shown in FIG. 12 can be extended into a laminated glazing by providing the encapsulating layer as an encapsulating sealant. Naturally, on top of the encapsulating layer 340, a further layer of glass or a similar transparent or translucent material 240-1 may be laminated or fixed otherwise. By providing the layer 240-1 and resulting in the structure referred to in FIG. 13 as structure B, the mechanical stability of the resulting panel 100 may be enhanced compared to the panel 100 as shown before comprising the structure A along with the encapsulating layer 340.

However, to further improve, for instance, security-related or safety-related features and properties, instead of laminating the single layer of glass 240-1, an arrangement as previously described in context with FIG. 11 may be laminated on top of the encapsulating layer 340. In other words, an arrangement 280 comprising two layers of glass 240-1, 240-2 with a foil 230, for instance a PVB foil, may be laminated on top of the encapsulating layer 340.

However, it should be noted that any layer of glass as described above or any further layer of glass may comprise any glass material. For instance, a silica-based glass may be used as the glass material. However, such a material may also be substituted by polycarbonate, poly(methylmethacrylate) (PMMA) or a similar transparent or translucent material.

FIG. 14 shows a simplified cross-sectional view of a further panel 100 according to an embodiment, which may be used, for instance, as a glass substrate 570 for a display to name just one example. The glass substrate 570 as shown in FIG. 14 comprises a translucent layer arrangement 110 comprising a pre-patterned translucent layer 320 in the form of a structured glass. As outlined before, the pre-patterned translucent layer 320 comprises a plurality of recesses 330 into which battery cells 120 in the form of micro-batteries 520 are at least partially embedded. To provide electrical contact of an anode (first electrode material 550; not shown in FIG. 14), the substrate 530 along with the cathode (second electrode material 560) is electrically contacted by an electrode contact structure 370, for instance TCO contact layer. On top of the translucent layer arrangement 110 facing away from the battery cells 120, the glass substrate 570 further comprises a display 580 which may be, for instance, implemented as a liquid crystal display (LCD).

FIG. 14 illustrates other possible small-scale applications of a panel 100 according to an embodiment. In these applications, batteries or battery cells 120 may be integrated, for instance, into a backside, such as a glass substrate 570, of a LC display or solar cells to name just two examples.

For a vehicle or façade and roof integration, where safety-related and/or security-properties of a glazing may be important or even essential, where broken glass might injure individuals or endanger human life, micro-batteries 520 and other battery cells 120 may be implemented by laminating them between existing layers, for instance, by using PVB foil as, for instance, outlined above. In other words, it may be possible to extend a procedure to manufacture a panel 100 according to an embodiment by additionally integrating or embedding battery cells, for instance, in a lamination process comprising a PVB foil. Naturally, the battery cells 120 may be part of a heat insulating glazing together with solar cells 290 or may be independently implemented.

As outlined before, technologically it may be advisable to separate the PVB lamination processes from other fabrication processes or to have the PVB lamination processes taking place first due to the high temperature required for PVB lamination processes. Depending on the battery cell technology involved, it may be advisable to process the battery cells 120 or micro-batteries 520 in terms of a low temperature lamination process afterwards or separately.

As will be outlined in more detail below, an assembly or fabrication process can be implemented in a great variety of ways. For instance, the contacts or the electrical contact structure 370 for the battery cell connection may be realized by depositing an appropriate material such as a TCO (Transparent Conductive Oxide) on a pre-patterned or structure glass and etched afterwards. The batteries may, for instance, be connected to the electrical contacts deposited on the glass by using conductive glue or a similar procedure, for instance, by printing the respective structures. For sensitive battery cells and batteries, it may be advisable to implement a predefined or fixed distance between glazings.

Alternatively or additionally, it may be possible to assemble the batteries onto glass and deposit, for instance, TCO contacts or other electrical contact structures 370 after that. Depending on a size of the battery cells, the battery cells 120 may be assembled into wells in a structured or pre-patterned glass. The deposition and patterning of the electrical contact structure 370 may follow after that as, for instance, outlined in the context of FIGS. 12 and 13.

With respect to FIGS. 15*a*, 15*b* and 15*c*, a simplified battery assembly will be described next. The process described may, for instance, lead to construction of a laminated glazing as shown, for instance, in FIG. 13.

Figure 15A:
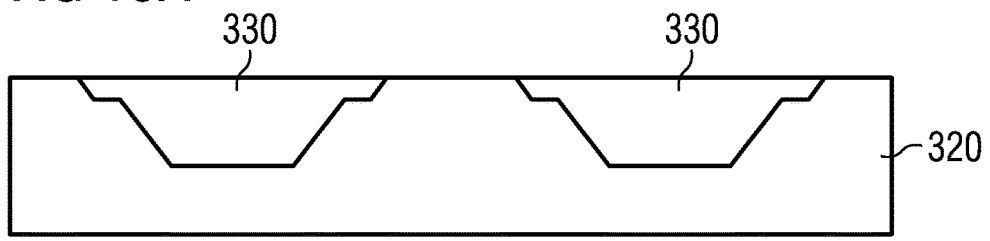
FIG. 15a shows a schematic cross-sectional view of a first intermediate state of a panel according to an embodiment being fabricated.

FIG. 15a shows a simplified cross-sectional view of a pre-patterned translucent layer 320 such as a pre-structured glass. The pre-patterned translucent layer 320 comprises a plurality of recesses 330 into which the battery cells 120, such as the micro-batteries 520 may be assembled. The recesses 330 may, for instance, be fabricated by first cleaning a glass substrate or a similar substrate forming after further processing the pre-patterned translucent layer 320. Then, the cavities or recesses 330 may be engraved, for instance, by using large-scale engraving lasers. To achieve this, programmable CAD lasers (CAD=Computer-Aided Design) such as Nd:YAG industrial lasers may be used. Depending on the contour or geometry of the recesses 330, engraving may comprise several steps of repeated laser engraving processes.

Afterwards, it may be advisable to clean the engraved areas.

Next, the electrical contact structure 370 may be deposited and, if necessary, patterned. To fabricate the electrical contact structure 370 comprising, for instance, TCO or a similar material, ink-jet printing, spraying, depositing and patterning or other process steps may be used. The situation after depositing the electrical contact structure 370 at least partially is depicted in FIG. 15b. Here, the situation of FIG. 15a is illustrated. However, compared with FIG. 15a, at least some parts of a surface 360 of the pre-patterned translucent layer 320, the electrical contact structure 370 is (also at least partially) deposited.

Figure 15B:
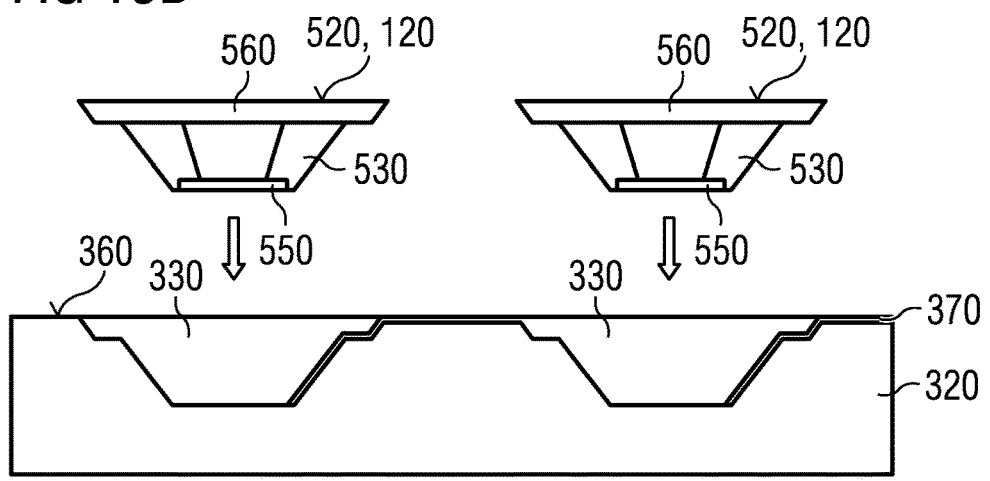
FIG. 15b shows a schematic cross-sectional view of a further intermediate state of a panel according to an embodiment being fabricated.

FIG. 15b furthermore shows two micro-batteries 520 as examples of battery cells 120 to be embedded into a translucent layer arrangement 110 in the further processes. However, in contrast to the micro-batteries 520 as described in the context of FIG. 10, the electrical contact of the first electrode material 550 is not at least completely managed by the substrate 530. In the example shown in FIGS. 15a, 15b and 15c, the electrical contact structure 370 extends into the recesses 330 allowing the first electrode material 550 to be electrically contacted either directly or via a smaller portion of the substrate 530. The battery case or substrate 530 may, for instance, comprise silicon (Si) or some other material and include a solid or fluid electrolyte as previously described in the context of FIG. 10.

In a following process, also illustrated in FIG. 15b, the micro-batteries 520 or battery cells 120 may be glued or positioned into the engraved recesses 330 by, for instance, a programmable tool such as a common pick-up tool used in the electronic industry. The electrical contact may be achieved by an electrical conducting loop or resin.

After removing unwanted glue or resin residuals, an optional hardening or drying of the glue and resin, for instance, by radiation with ultraviolet light (UV light), the area covered by glue or resin may be polished. If necessary or advisable the electrical contact structure 370 may be completed, for instance, by depositing an additional contact layer such as the previously-mentioned TCO.

Figure 15C:
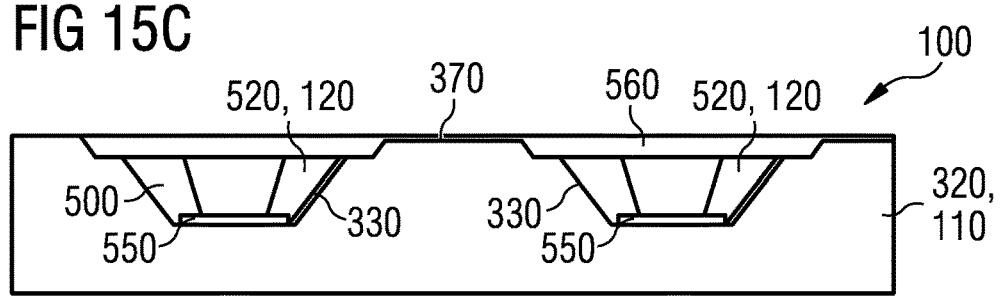
FIG. 15c shows a schematic cross-sectional view of a further intermediate state of a panel according to an embodiment being fabricated.

This situation is shown schematically in FIG. 15c. Here, the pre-patterned translucent layer 320 comprises inside the recesses 330 the micro-batteries 520 or battery cells 120 such that the battery cells 120 are at least partially embedded into a translucent layer arrangement 110 comprising the pre-patterned translucent layer 320. In other words, FIG. 15c shows a panel 100 according to an embodiment.

In this simplified battery assembly process as outlined before, the pre-patterned translucent layer 320, for instance, in the form of a pre-structured glass, may be produced to become a part of the laminated glazing. After production of the micro-batteries 520 or other battery cells 120, the micro-batteries 520 or battery cells 120 may be integrated into the glazing comprising, optionally, a pre-structured electrical contact structure 370 leading to the panel 100 as depicted in FIG. 15c with the integrated micro-batteries 520 or the battery cells 120.

An alternative process instead of engraving to fabricate the pre-patterned translucent layer 320 may comprise, for instance, etching glass with hydrogen fluoride (HF), glass molding, for instance molding of hot glass to form the required shape including the cavities or recesses 330, glass rolling by, for instance, producing channels in the glass by rolling hot glass using a pre-structured roller, soft blasting, leading to a formation of channels and cavities, ultrasonic drilling or other mechanical processes like drilling, sawing or engraving.

Figure 16:
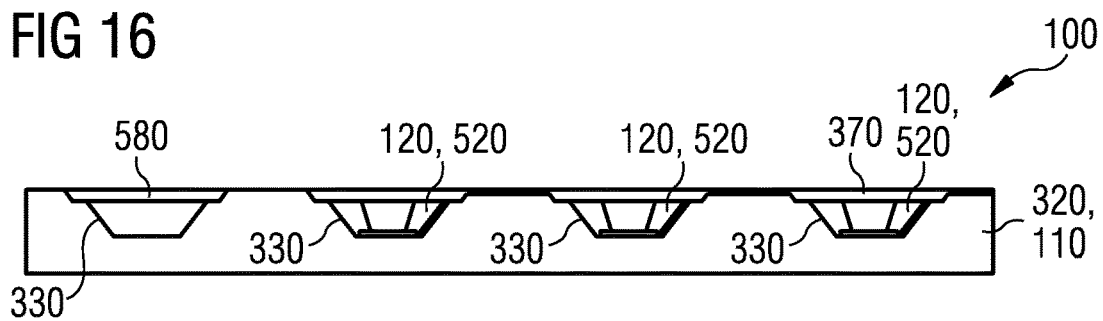
FIG. 16 shows a simplified cross-sectional view of a panel according to an embodiment comprising a circuit.

FIG. 16 finally shows a panel 100 according to an embodiment comprising a pre-patterned translucent layer 320 forming at least partially the translucent layer arrangement 110. As previously described, the pre-patterned translucent layer 320 comprises a plurality of recesses 330 into which battery cells 120 or micro-batteries 520 are assembled. An electrical contact structure 370 is also implemented as described previously.

However, in one of the recesses 330 a circuit 580 having a similar geometry as the micro-batteries 520 is implemented which may be used to process or manipulate the electrical signals provided by the micro-batteries 520 or to the micro-batteries 520. For instance, the circuit 580 may be capable of providing an alternating current signal based on a direct current signal received from the micro-batteries 520. In other words, the circuit 580 may comprise an inverter.

In the case of secondary battery cells 120 being implemented as micro-batteries 520, the circuit 580 may additionally or alternatively be used as a battery management circuit or system, providing the individual micro-batteries 520 or battery cells 120 with the respective current and voltage to charge the micro-batteries 520. For instance, the circuit 580 may be configured to provide, based on an alternating current signal, a direct current signal to the individual micro-batteries 520 to charge them.

Here, the same battery management circuit 580 may be used for several or all battery cells 120 as shown in FIG. 16. Naturally, for every battery, an individual circuit 580 may be implemented in another panel 100 according to an embodiment. This may, for instance, depend on the battery cell type or micro-battery type used. The electrical connections between the battery management circuit 580 and an external power source such as another battery, a solar module or the like, may be done using the same connecting techniques used to connect the micro-batteries 520 with the circuit 580. In other words, the external power source may be connected, for instance, using the electrical contact structure 370 comprising, for instance, a TCO as shown in the previously-described implementations. In other words, FIG. 16 shows a cross-sectional view of a panel 100 according to an embodiment with a battery management circuit integrated together with the batteries 520.

Naturally, instead of integrating the micro-batteries 520 along with the battery management circuit 580 as shown in FIG. 16, the battery management electronic circuit can be monolithically integrated into the battery cell 120 or the micro-battery 520.

Similar solutions related to some of the described application examples may also be implemented by integrating solar cells and micro-batteries into one unit and integrating the same into a panel 100. However, instead of the previously-described micro-batteries 500 integrated into glass or glazing, naturally all other battery cells 100 may be used. Similarly, the batteries cells 120 may be implemented into a translucent layer arrangement 110 as outlined before.

Figure 17:
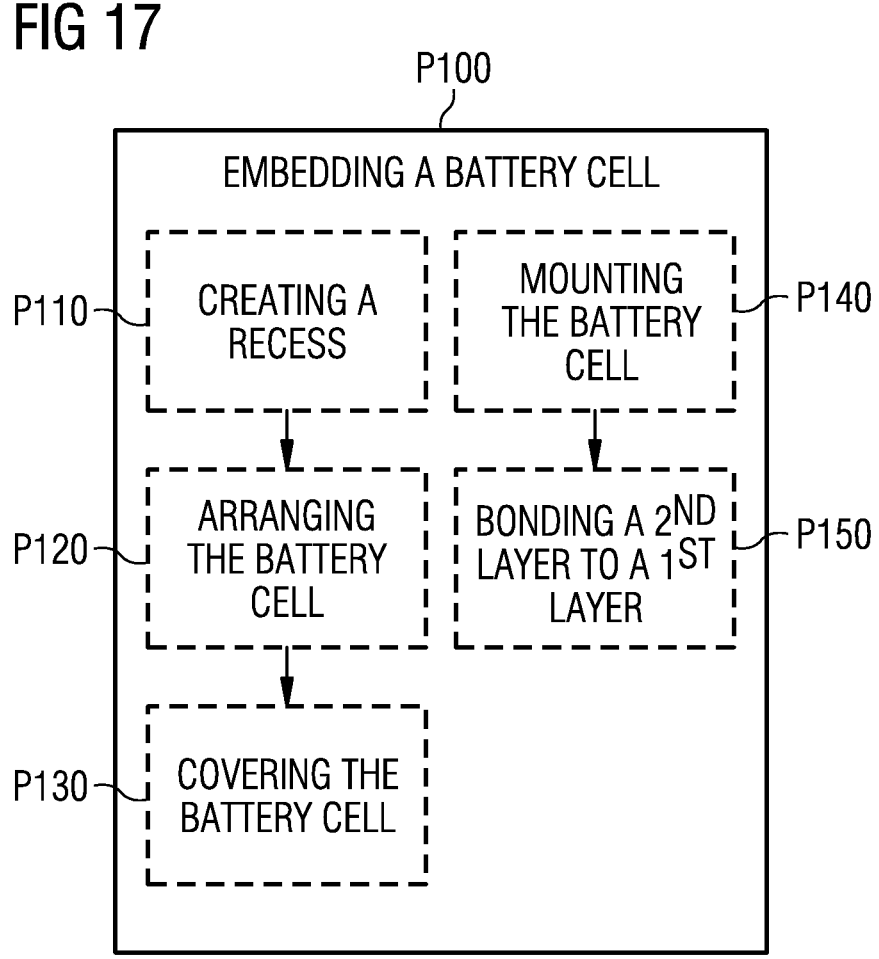
FIG. 17 shows a flowchart of a method for fabricating a panel according to an embodiment.

FIG. 17 shows a flowchart of a method for fabricating a panel 100 according to an embodiment. The method comprises in a process P100 embedding a battery cell 120 at least partially into a translucent layer arrangement 110. Optionally, embedding the battery cell (process P100) may comprise in a process P110 creating a recess 330 to accommodate the battery cell 120 fully or at least partially in a translucent layer of the translucent layer arrangement. It may further comprise, in a process P120, arranging the battery cell 120 in the recess 330 and, in a process P130, covering the battery cell 120 and the recess 330 with an encapsulating layer 340.

Creating the recess in the process P110 may comprise creating the recess in a glass material of a translucent layer by at least one of engraving the glass material, etching the glass material, molding the glass material, glass rolling, sand-blasting, ultrasonic drilling, drilling, sawing, and mechanical engraving.

Additionally or alternatively, embedding the battery cell in the process P100 may comprise mounting the battery cell in a first layer in a process P140 and, in a process P150, bonding a second layer to the first layer by providing an adhesive layer between the first layer and the second layer such that the adhesive layer surrounds the battery cell 120 at least partially laterally. In this case, at least one of a first layer and as second layer is translucent.

Naturally, the process flows described may also be combined. Moreover, the described order of the processes may be changed. The processes may also be fully or partially carried out simultaneously or at least overlapping in time.

Figure 18:
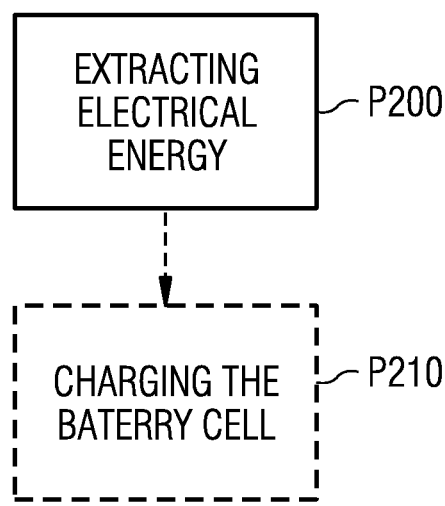
FIG. 18 shows a flowchart of a method according to an embodiment.

FIG. 18 shows a flow chart of a further method according to an embodiment. For instance, in terms of operating a panel 100, such a method may comprise in a process P200 extracting electrical energy from a battery cell 120 comprised in a translucent layer arrangement 110 of the panel 100. The battery cell 120 is embedded at least partially into the translucent layer arrangement 110. Optionally, the method may further comprise in a process P210 charging the battery cell 120. FIG. 18 shows an appropriate flowchart of this method.

It is to be noted that the processes may be conducted in the order as given in FIGS. 17 and 18. However, in other embodiments, the processes may eventually be operated in a different order, timely overlapping or even simultaneously.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The methods described herein may be implemented as software, for instance, as a computer program. The sub-processes may be performed by such a program by, for instance, writing into a memory location. Similarly, reading or receiving data may be performed by reading from the same or another memory location. A memory location may be a register or another memory of an appropriate hardware. The functions of the various elements shown in the Figures, including any functional blocks labeled as "means", "means for forming", "means for determining" etc., may be provided through the use of dedicated hardware, such as "a former", "a determiner", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes, which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A panel comprising:
    a translucent layer arrangement comprising a first translucent layer and a second translucent layer,
    wherein the first translucent layer has a first portion having a first thickness and top surface characterized by a first surface area,
    wherein the first translucent layer includes a recess comprising a second portion of the first translucent layer having a reduced thickness to define recess walls and a recess bottom surface such that the recess bottom surface is characterized by a second surface area that is smaller than the first surface area; and
    wherein a first battery cell is embedded at least partially into the recess such that the first battery cell is in direct contact with the recess bottom surface and at least partially surrounded by the recess walls, such that the first battery cell is embedded in the first translucent layer between the first translucent layer and the second translucent layer;
    a third layer comprising solar cells; and
    a partially translucent electrical contact structure connecting the solar cells to the first battery cell.

2. The panel according to claim 1, wherein the panel is at least partially spatially translucent, and wherein the first battery cell is embedded in a field of vision of the panel.

3. The panel according to claim 1, wherein the translucent layer arrangement comprises an adhesive layer to bond the first translucent layer and the second translucent layer, wherein the adhesive layer surrounds the first battery cell at least laterally.

4. The panel according to claim 3, wherein the adhesive layer comprises at least one of a silicone and a resin.

5. The panel according to claim 1, further comprising a second battery cell.

6. The panel according to claim 5, wherein the second battery cell is embedded in a second recess in the first translucent layer.

7. The panel according to claim 5, wherein the first battery cell and the second battery cell are connected in parallel with one another.

8. The panel according to claim 1, wherein the solar cells are configured to charge the first battery cell.

9. The panel according to claim 1, wherein the first battery cell is fully embedded within the recess such that a top surface of the first battery cell is planar with respect to a top surface of the first translucent layer.

10. The method according to claim 1, wherein the first translucent layer comprises a pre-patterned translucent layer comprising the recess.

11. The panel according to claim 10, wherein the pre-patterned translucent layer is formed by a glass material.

12. The panel according to claim 10, wherein the recess and the first battery cell is covered by an encapsulating layer.

13. The panel according to claim 12, wherein the panel is at least partially spatially translucent, and wherein the encapsulating layer covers a surface of a pre-patterned translucent layer in a field of vision of the panel completely.

14. The panel according to claim 1, wherein the electrical contact structure comprises a partially translucent electrically conducting material patterned on the first translucent layer.

15. The panel according to claim 5, wherein the first battery cell and the second battery cell are connected in series with one another.

16. A method for fabricating a panel, the method comprising:
    providing a first battery cell;
    embedding the first battery cell at least partially into a translucent layer arrangement comprising a first translucent layer and a second translucent layer by embedding the first battery cell into a recess in the first translucent layer, wherein the first translucent layer has a first portion having a first thickness and a top surface characterized by a first surface area, further wherein the recess comprises a portion of the first translucent layer having a reduced thickness to define recess walls and a recess bottom surface, such that the recess bottom surface is characterized by a second surface area that is smaller than the first surface area and the first battery cell is in direct contact with the recess bottom surface and at least partially surrounded by the recess walls
    providing a third layer comprising solar cells; and
    arranging, on the first layer, a partially translucent electrical contact structure connecting the solar cells to the first battery cell.

17. The method according to claim 16, wherein embedding the first battery cell further comprises covering the first battery cell and the recess with an encapsulating layer.

18. The method according to claim 16, wherein embedding the first battery cell comprises mounting the first battery cell in the recess and bonding the second translucent layer to the first translucent layer by providing an adhesive layer between the first translucent layer and the second translucent layer such that the adhesive layer surrounds the first battery cell and at least partially laterally.

19. A method comprising:
    embedding a first battery cell at least partially into a translucent layer arrangement comprising a first translucent layer and a second translucent layer by embedding the first battery cell into a recess in the first translucent layer, wherein the first translucent layer has a first portion having a first thickness and a top surface characterized by a first surface area, further wherein the recess comprises a portion of the first translucent layer having a reduced thickness to define recess walls and a recess bottom surface, such that the recess bottom surface is characterized by a second surface area that is smaller than the first surface area and the first battery cell is in direct contact with the recess bottom surface and at least partially surrounded by the recess walls;
    providing a third layer comprising solar cells;
    arranging, on the first layer, a partially translucent electrical contact structure connecting the solar cells to the first battery cell; and
    storing electrical energy from the solar cells in the first battery cell.

20. The method according to claim 19, further comprising extracting stored electrical energy from the first battery cell.

* * * * *